United States Patent [19]

Wenzel

[11] 4,347,626

[45] Aug. 31, 1982

[54] RADIO TELEPHONE COMMUNICATION NETWORK

[75] Inventor: Manfred Wenzel, Berlin, Fed. Rep. of Germany

[73] Assignee: Robert Bosch GmbH, Stuttgart, Fed. Rep. of Germany

[21] Appl. No.: 106,159

[22] Filed: Dec. 21, 1979

[30] Foreign Application Priority Data

Dec. 23, 1978 [DE] Fed. Rep. of Germany ....... 2856019

[51] Int. Cl.³ .............................................. H04B 7/26
[52] U.S. Cl. ....................................... 455/18; 455/33; 455/54; 455/57
[58] Field of Search ................... 455/7, 12, 13, 15, 18, 455/32, 33, 34, 36, 38, 54, 55, 56, 58, 57; 179/2 E, 2 EA, 2 EB, 2 EC, 84 R, 84.55

[56] References Cited

U.S. PATENT DOCUMENTS

| | | | |
|---|---|---|---|
| 3,646,441 | 3/1972 | Magnuski | 455/18 |
| 3,646,580 | 2/1972 | Fuller | 455/56 |
| 3,899,772 | 8/1975 | Mead et al. | 455/54 |
| 4,025,853 | 5/1977 | Addeo | 455/33 |
| 4,092,600 | 5/1978 | Zimmermann | 455/54 |

FOREIGN PATENT DOCUMENTS 2445296 10/1975 Fed. Rep. of Germany .

OTHER PUBLICATIONS

Bosch, Technical Bulletin, Tone-calling Accessories for Series KF Radio-Telephones, published Mar. 1977.

*Primary Examiner*—Tommy P. Chin
*Attorney, Agent, or Firm*—Spencer & Kaye

[57] ABSTRACT

In a relay station for use in a radio telephone network, which relay station includes a time storage unit composed of a time delay member connected to be switched, in response to recognition of a calling signal by its associated evaluator, from a reset state in which it is inactive to a set state in which it triggers emission of an identification signal after a delay period which is characteristic of the relay station and which differs from that of all other relay stations in the network, a member responsive to detection of such selective calling signal by its associated evaluator subsequent to recognition of a calling signal and prior to emission of a resulting identification signal for returning the time delay member to its reset state and preventing emission of that identification signal, and a member for automatically returning the time delay member to its reset state at the end of a time interval which follows recognition of a calling signal and is longer than the longest delay period characteristic of any relay station in the network.

8 Claims, 3 Drawing Figures

RADIO TELEPHONE COMMUNICATION NETWORK

BACKGROUND OF THE INVENTION

The present invention relates to radio telephone communication network of the type composed of a central station, at least two relay stations operating in the same radio channel and a plurality of substations.

In a prior art network of this type, the decision to establish a radio telephone connection from a certain substation can be indicated by transmitting from that substation a certain calling signal which is generally received simultaneously by a plurality of relay stations. Each relay station has an evaluator which has an evaluation period that is characteristic for the respective relay station. The evaluation periods of the evaluators in the relay stations are thus staggered in time. This has the inevitable result that the transmission of a calling signal from any substation must be at least as long as the longest evaluation duration of all evaluators in the relay stations of the radio telephone network.

Aside from the relatively long transmitting time required for a calling signal, this procedure also has the drawback that a change of location of a mobile substation during transmission of a calling signal will prevent evaluation in the relay stations from being performed with sufficient dependability.

A further drawback of prior art radio telephone networks is that in a case where a mobile substation is disposed in the vicinity of a relay station having an evaluator with a relatively short evaluation duration, the central station is unable to cause the relay station to switch through the radio telephone connection by way of a selective calling signal before receipt of the relatively long calling signal is completed.

Finally, the prior art radio telephone network has the further drawback that it cannot prevent the relay stations which the central station does not call by their characteristic selective calling signals from transmitting their identification signals to the central station although the central station already has called one relay station with its selective calling signal.

SUMMARY OF THE INVENTION

It is an object of the present invention to make possible relatively short transmitting times for the calling signals of the substations.

Another object of the invention is to provide the capability for preventing all relay stations not called by the central station with their selective calling signals from sending their identification signals to the central station.

These and other objects are achieved, according to the invention, in a relay station for use in a radio telephone network that includes a central station, at least two such relay stations and a plurality of substations, all operating in the same radio channel, each substation being constructed to initiate a radio telephone connection by transmitting a calling signal which is received simultaneously by more than one relay station, each relay station including a respective evaluator constructed to evaluate each received calling signal and to emit to the central station, an identification signal characteristic for the relay stations upon recognition of a calling signal as the correct one, and the central station being constructed to transmit a selective calling signal to the relay station whose identification signal is received first to cause the latter relay station to switch through the radio telephone connection, by constructing the evaluator of each relay station to detect selective calling signals emitted by the central station and not intended for its respective relay station, and by including in each relay station a time storage unit composed of: time delay means connected to be switched, in response to recognition of a calling signal by the associated evaluator, from a reset state in which it is inactive to a set state in which it triggers emission of an identification signal after a delay period which is characteristic of the relay station and which differs from that of all other relay stations in the network; means responsive to detection of such selective calling signal by its associated evaluator subsequent to recognition of a calling signal and prior to emission of a resulting identification signal for returning the time delay means to its reset state and preventing emission of that identification signal; and means for automatically returning the time delay means to its reset state at the end of a time interval which follows recognition of a calling signal and is longer than the longest delay period characteristic of any relay station in the network.

According to preferred embodiment of the invention, the storage unit is composed of a start logic circuit connected to the evaluator of the relay station, a clock pulse generator which can be switched on and off by the start logic circuit, and a counting circuit controlled by the clock pulse generator, the counting circuit being switchable to any desired preselectable delay period and being connected with the start logic circuit. The time storage unit can be constructed from components customarily employed in the digital data processing art.

DESCRIPTION OF THE PREFERRED EMBODIMENTS

Figure 1:
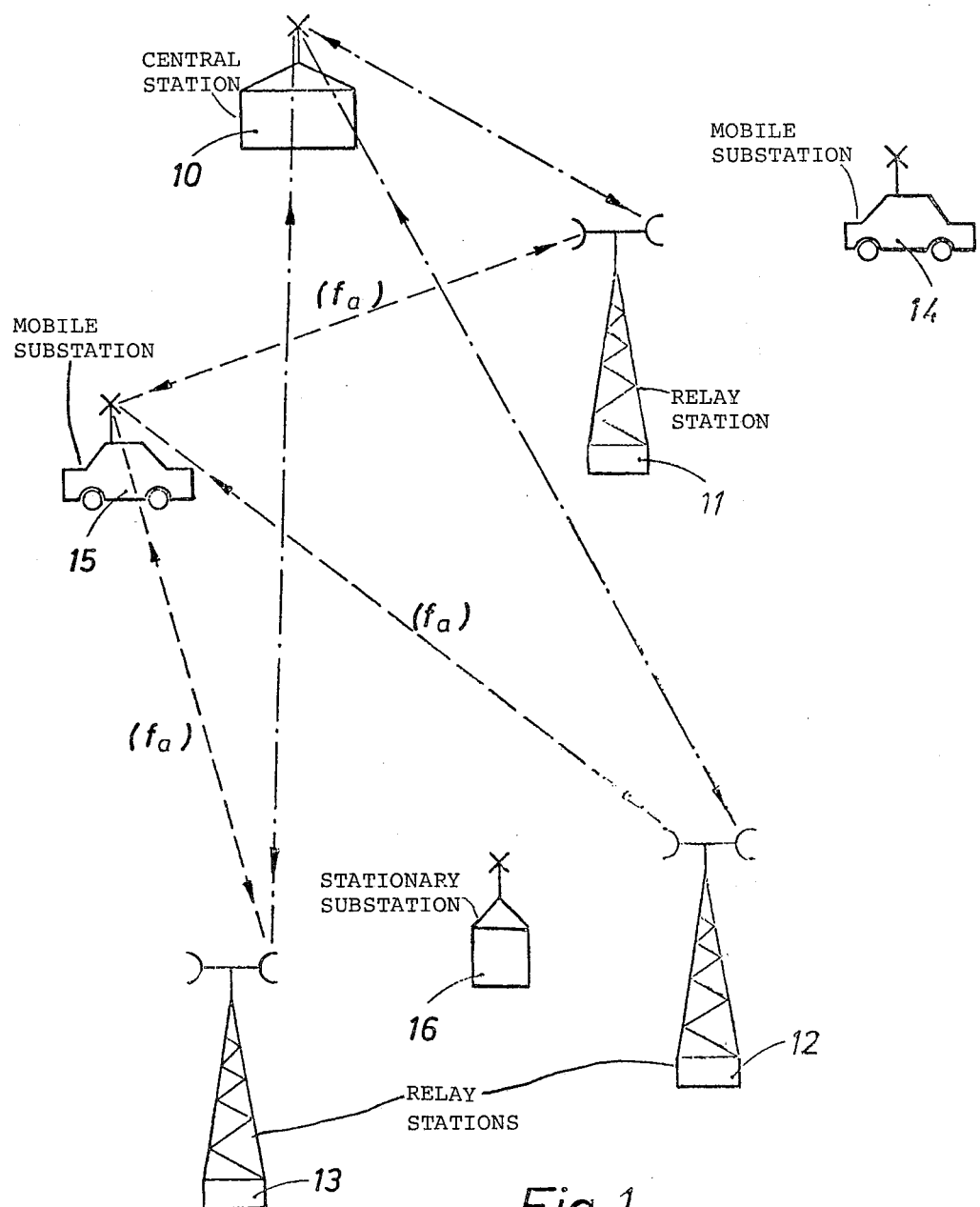
FIG. 1 is a pictorial representation of a radio telephone network according to the invention.

A radio telephone network according to the invention as illustrated in FIG. 1 includes a central station 10, three relay stations 11, 12 and 13, two mobile substations 14 and 15 and one stationary substation 16. The central station, the relay stations and the substations are all equipped with radio transmitting and receiving devices as well as transmitting and receiving antennas. These devices and antennas will be described below only to the extent that they differ from conventional units known to the person skilled in the art.

Figure 2:
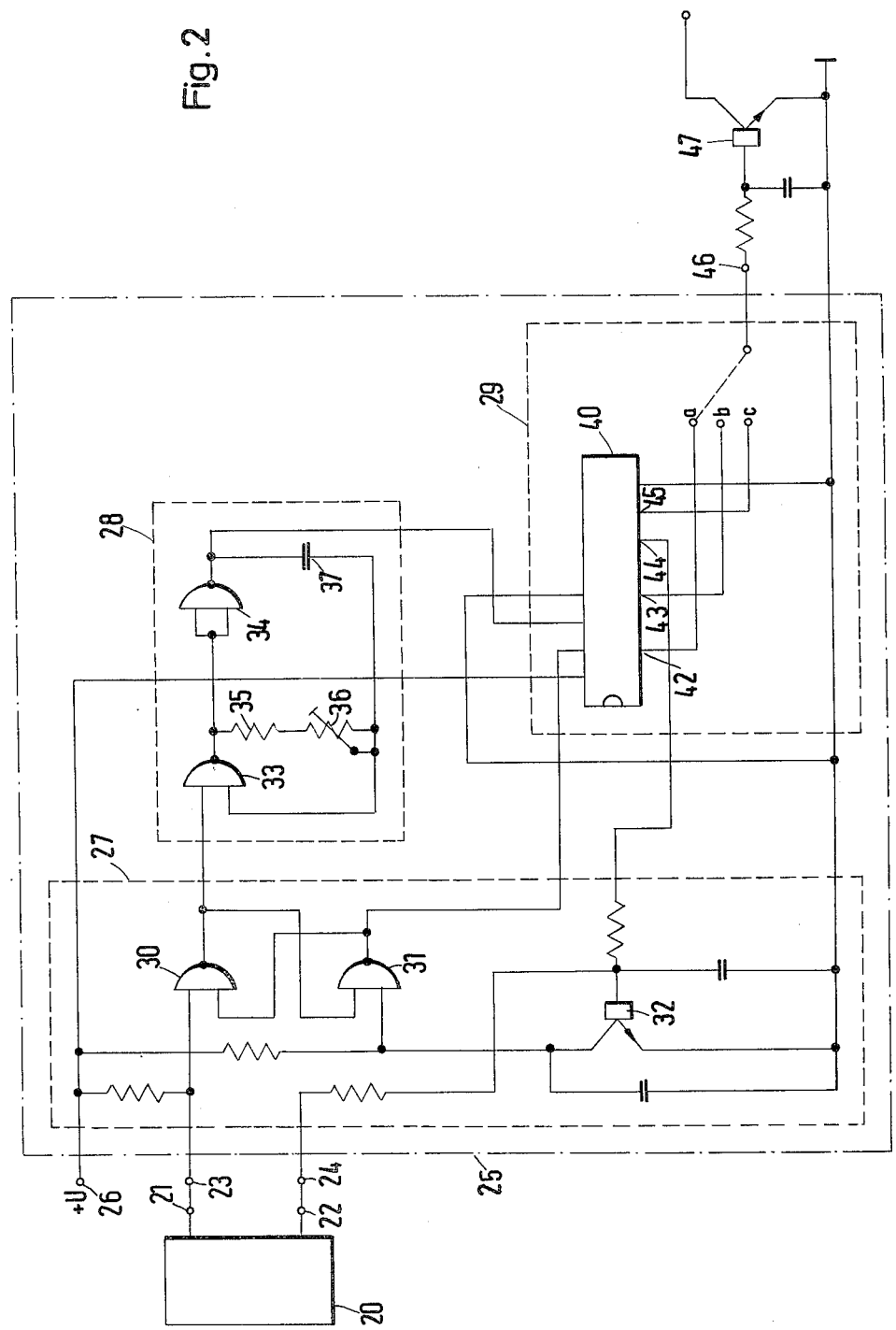
FIG. 2 is a block circuit diagram of a preferred embodiment of a time storage unit according to the invention.

Referring to FIG. 2, each relay station 11, 12, 13 includes an evaluator 20, with which a received and demodulated calling signal as well as a received and demodulated selective calling signal, which will be explained below, can be received. The evaluator 20 has two outputs 21 and 22 each connected with a respective input 23 or 24 of a time storage unit 25. A terminal 26 of the time storage unit 25 is connected with a pole, preferably the positive pole, of a direct operating voltage source providing the voltage U. The time storage unit includes a start logic circuit 27, a clock pulse generator 28 and an electronic counting circuit 29.

The start logic circuit 27 essentially includes a flip-flop circuit composed of two NAND gates 30 and 31 as well as a transistor 32 for resetting the start logic circuit. The clock pulse generator 28 is composed of two further NAND members 33 and 34, two resistors 35 and 36 and a capacitor 37. The electronic counting circuit 29 includes a decimal, or digital, counter 40, preferably in the form of an integrated circuit, having outputs 42, 43 and 45 each leading to a respective one of the terminals a through c.

If only three relay stations are part of the radio telephone network, as in the case assumed in FIG. 1, the time storage unit 25 of each relay station connects a respectively different one of three terminals with an output 46 of that time storage unit 25. In the embodiment shown in FIG. 2, the connection is made between terinal a and output 46. The latter output is connected to circuit component including a further transistor 47 whose significance will be described below.

The operation of the evaluator 20 and the time storage unit 25 of the relay stations will now be described.

Before initiation of a radio connection, logic circuit 27 will have been set into a starting state in which transistor 32 is nonconductive and, assuming positive logic, an H, or logic "1", value, i.e. a positive voltage, is present at both inputs of NAND gate 30 and at that input of NAND gate 31 which is connected to transistor 32, as well as at the output of gate 31. An L, or logic "0", value i.e. approximately ground potential, is present at the output of gate 30 and hence at the other input of gate 31.

To initiate a radio connection, one substation, for example the mobile station 15 shown in FIG. 1, transmits a calling signal. The calling signal is received simultaneously by the three relay stations 11, 12 and 13. The calling signal, which modulates the radio frequency carrier, is preferably an audio frequency signal at the frequency $f_a$ of, for example, 2600 Hertz and a duration $t_a$ of, for example, 500 ms.

The evaluators 20 of the three relay stations evaluate the demodulated calling signal and, if the calling signal has been recognized as being the correct one, emit a certain signal at their output 21, for example an L, or low, or logic 0, signal, which is fed to the input 23 of the time storage unit 25. The L signal flips the flip-flop circuit including the NAND members 30 and 31 and the resulting change in the output state of member 30 switches on the clock pulse generator 28, while the change in output state of member 31 resets counter 40.

The clock pulse generator 28 transmits a sequence of square wave pulses to the electronic counter 29 at a repetition rate of, for example, 1 Hertz. The repetition rate is determined by the values of the resistors 35 and 36 and of the capacitor 37.

With the beginning of the first square wave pulse then received from the clock pulse generator 28, which occurs just after switch-on of generator 28 and resetting of counter 40, the decimal counter 40 is controlled in such a way that a certain signal, for example an H, or logic "1", signal is emitted at its output 42, which signal switches, via the terminal a and the output 46, the further transistor 47 into its saturation state. This causes emission of an identification signal that is characteristic for the respective relay station 11. The relay station 11 transmits this identification signal, modulated on a carrier, to the central station 10. In the above-described example it is assumed that the time storage unit 25 of the relay station 11 has the shortest delay period of all relay stations, for example zero second.

In the time storage unit 25 of the relay station 12, for example, the terminal b and, in the relay station 13, the terminal c would then be connected with the output 46. In this system, output 43 presents an H signal with the beginning of the second square wave pulse from generator 28 and output 45 presents an H signal with the beginning of the third of such pulses. That is, the relay stations 11, 12 and 13 can transmit their identifications to the central station only staggered in time relative to one another.

When the relay station 11 has transmitted its identification to the central station 10 and this identification has there been determined to be correct, the central station 10 transmits a selective calling signal which is characteristic for the relay station 11. This selective calling signal, which only the relay station 11 can detect as being the correct signal, causes the radio connection in relay station 11 to be switched through.

The fourth square wave pulse produced by the clock pulse generator 28 after it has been turned on by an incoming calling signal causes the output 44 of the decimal counter 40 to emit a count signal which drives the transistor 32 into saturation and thus places the collector of transistor 32 close to ground potential and flips the flip-flop circuit including the NAND gates 30 and 31. This stops the clock pulse generator 28 and resets the counter 40.

Figure 3:
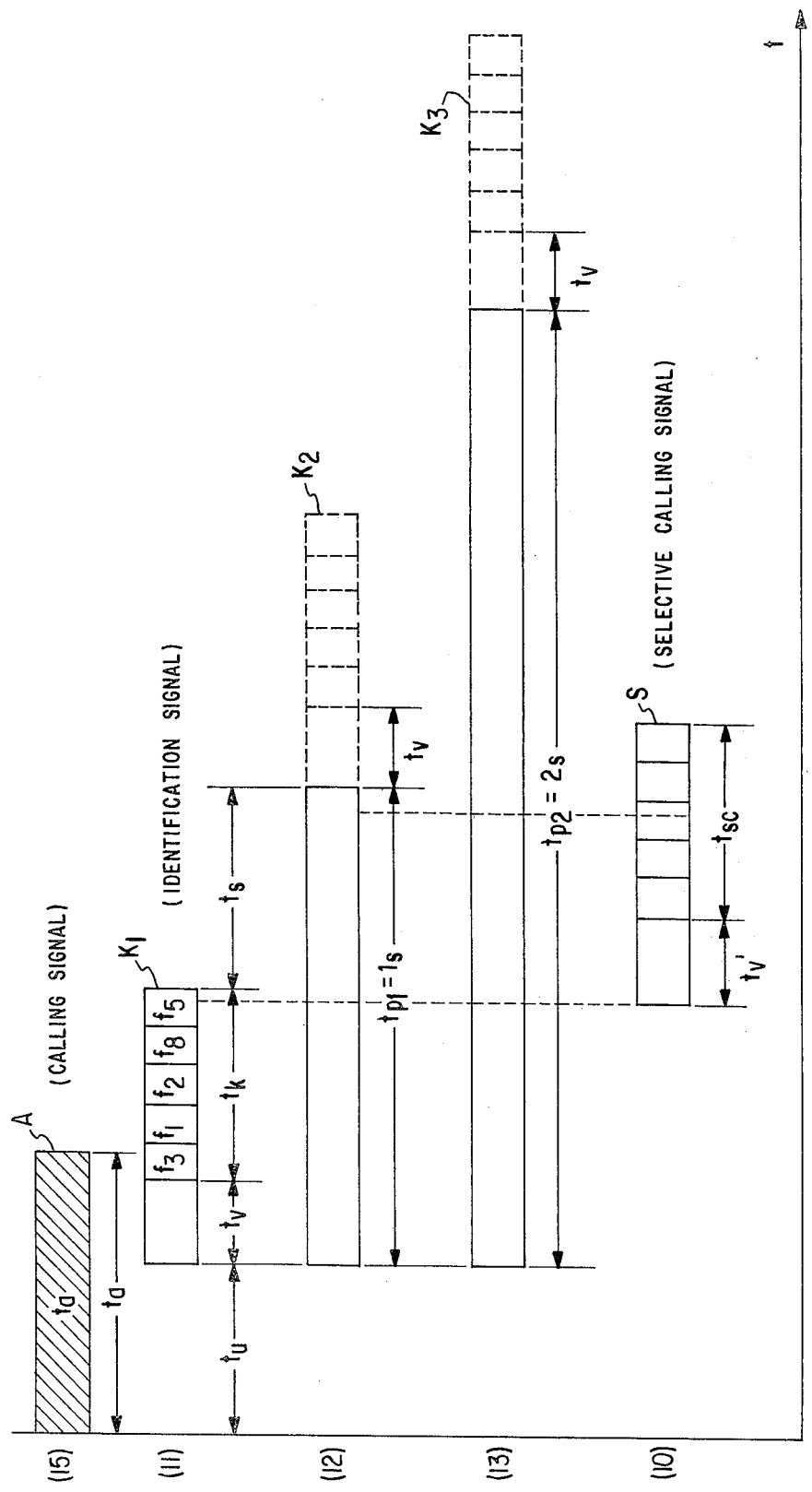
FIG. 3 is a time diagram illustrating a transmitting time scheme for one substation and three relay stations according to the invention.

The relay stations 12 and 13 cannot emit their identification signals if the relay station 11 has already sent its identification to the central station 10 for the following reasons, taking into consideration FIG. 3 which is a time diagram illustrating the emission of a calling signal A, identification signals K, and a selective calling signal S.

After the start of calling signal A, relay stations 11, 12 and 13 need an evaluation period $t_u$ of, for example, 350 ms to evaluate the signal. Relay station 11$^u$ then emits with a delay time $t_v$ its identification signal $K_1$ which consists of, for example, five tones of the frequencies $f_3$, $f_1$, $f_2$, $f_8$, $f_5$. Central station 10 receives identification signal $K_1$ and evaluates it. With a delay time $t_v'$ the central station 10 emits a selective calling signal S which can be received from all relay stations. The relay stations 12, 13 receive the selective calling signal not intended for them before expiration of the respective time delay $t_p$ preceding emission of their respective identification signal. This is assured by the presence of safety interval $t_s$ between the end of identification signal K, of station 11 and the end of delay period $t_p$ of station 12.

If the relay stations 12 and 13 receive a selective calling signal that is not intended for them, i.e. a sequence of five tones, for example, a certain signal, preferably an H signal, will already be emitted at the output 22 of evaluator 20 after the evaluation of the third incorrect tone. This signal acts, via transistor 32 and the flip-flop circuit including the NAND members 30 and 31, to stop the clock pulse generator 28 and reset the decimal counter 40. For this reason the identification signals $K_2$ and $K_3$ of relay stations 12 and 13 are not emitted; see dotted lines in FIG. 3.

It should still be noted, in connection with the time scheme of FIG. 3, that $t_v$ constitutes a preliminary clock pulse period which is a result of start-up processes in the evaluation. $t_k$ is the duration of the identification signals $K_1$, $K_2$ and $K_3$, $t_{p1}$ is the delay period of the time storage device in relay station 12 and $t_{p2}$ is the delay period of the time storage device in relay station 13. The time storage unit of relay station 11, in the present case, has a delay period equal to zero so that there results the advantage that the emission of the identification signal of one relay station occurs at the earliest possible point in time.

In one preferred practical system according to the invention, the decimal counter 40 is preferably constituted by an integrated circuit of the type SCL 4017 and the NAND members 30, 31, 33 and 34 are preferably combined in an integrated circuit of the type SCL 4011. The transistors 32 and 47 may be, for example, of the type BC 238 B.

It will be understood that the above description of the present invention is susceptible to various modifications, changes and adaptations, and the same are intended to be comprehended within the meaning and range of equivalents of the appended claims.

What is claimed is:

1. In a radio telephone network that includes a central station, at least two relay stations and a plurality of substations, all operating in the same radio channel, each substation being constructed to initiate a radio telephone connection by transmitting a calling signal which is received simultaneously by more than one of the relay stations, each relay station including a respective evaluator constructed to evaluate each received calling signal and means controlled by the evaluator for emitting, to the central station, an identification signal characteristic of the relay station upon recognition of a calling signal as the correct one, and the central station being constructed to transmit a selective calling signal characteristic for only that relay station whose identification signal is received first by the central station to cause the latter relay station to switch through the radio telephone connection, the improvement wherein, in each said relay station, said evaluator serves to detect selective calling signals emitted by the central station and not characteristic for its respective relay station, and each said relay station includes a time storage unit comprising: time delay means connected to said evaluator of its respective relay station to be switched, in response to recognition of a calling signal by said associated evaluator, from a reset state in which it is inactive to a set state in which it triggers emission of an identification signal after a delay period which is characteristic of said relay station and which differs from that of all other relay stations in the network such that a first one of said relay stations has a characteristic delay period which is shorter than that of all other relay stations and a second one of said relay stations has a characteristic delay period which is longer than that of all other relay stations; and means responsive to detection of such selective calling signal by its associated evaluator subsequent to recognition of a calling signal and prior to emission of a resulting identification signal for returning said time delay means to its reset state and preventing emission of that identification signal, and said first one of said relay stations further comprises means for automatically returning its said time delay means to its reset state at the end of a time interval which follows recognition of a calling signal and is longer than the delay period characteristic of said second one of said relay stations in the network.

2. An arrangement as defined in claim 1 wherein said time delay means comprise: a start logic circuit connected to said associated evaluator; a clock pulse generator connected to be switched on and off by signals from said logic circuit; and an electronic counting circuit connected to have its count state controlled by said clock pulse generator and switchable to any desired, preselectable count.

3. An arrangement as defined in claim 2 wherein said start logic circuit comprises a flip-flop circuit composed of two NAND members.

4. An arrangement as defined in claim 2 wherein said clock pulse generator comprises an astable multivibrator composed of two NAND members and components connected for determining the pulse repetition period of said generator.

5. An arrangement as defined in claim 2 wherein said electronic counting circuit comprises a decimal counter having a plurality of outputs, one of which constitutes the output of said time storage unit and provides an output signal at a time after switching of said time delay means into its set state which corresponds to said delay period characteristic of the associated relay station.

6. An arrangement as defined in claim 2 wherein said electronic counting circut comprises a plurality of outputs each providing an output signal at a time after switching of said time delay means into its set state which corresponds to the delay period characteristic of a respective relay station of the network, and a further output providing an output signal at a time after switching of said time delay means into its set state which is longer than the longest delay period characteristic of any relay station in the network, said further output serving as a control input for said means for automatically returning.

7. An arrangement as defined in claim 1 wherein the calling signal emitted by a substation has a frequency of about 2600 Hz and a duration of about 500 ms.

8. An arrangement as defined in claim 1 wherein at least one of the identification signal and the selective calling signal is a five-tone sequence signal having a duration of about 600 ms.

* * * * *